J. F. PLUM.
Grain Separator.
No. 95,136.
Patented Sept. 21, 1869.
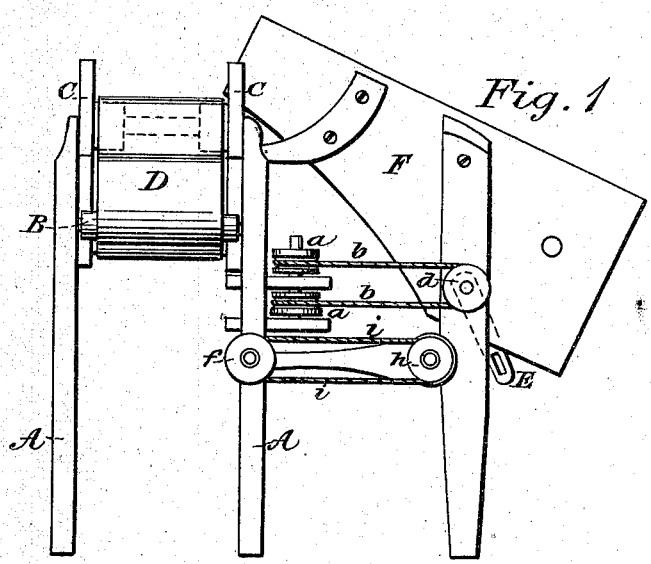
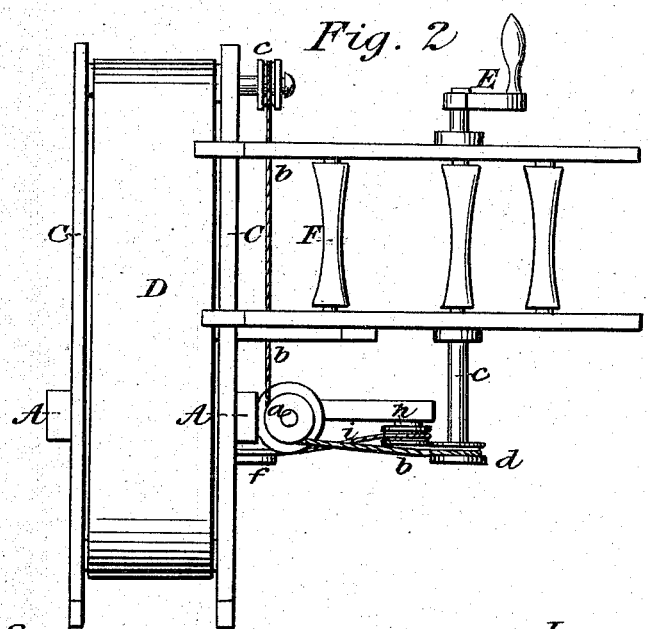
Witnesses:
Inventor:

United States Patent Office.

JOEL F. PLUM, OF NEAR GREENCASTLE, PENNSYLVANIA.

Letters Patent No. 95,136, dated September 21, 1869.

IMPROVEMENT IN GRAIN-SEPARATOR.

The Schedule referred to in these Letters Patent and making part of the same.

*To all whom it may concern:*

Be it known that I, JOEL F. PLUM, of near Greencastle, in the county of Franklin, and in the State of Pennsylvania, have invented certain new and useful Improvements in Grain-Separator; and do hereby declare that the following is a full, clear, and exact description thereof, reference being had to the accompanying drawings, and to the letters of reference marked thereon.

The nature of my invention consists in the construction and arrangement of an attachment for grain-separators, whereby I am enabled to carry the straw from the separator right or left in the mow, and carry the chaff out at the same time.

In order to enable others skilled in the art to which my invention appertains, to make and use the same, I will now proceed to describe its construction and operation, referring to the annexed drawings, which form a part of this specification, and in which—

Figure 1 is a side elevation, and

Figure 2 is a plan view.

A A represent two standards, of any suitable height, connected, near their upper ends, by means of a round bar, B.

Between the upper ends of the standards A A, above the bar B, the stacker C is pivoted.

The stacker C consists of a box, open at the top and both ends, and having at each end a roller, around which an endless apron, D, is placed. This stacker may be of any length desired, and being pivoted between the standards A A, can, of course, be raised or lowered at pleasure, so as to carry the straw in the mow either right or left.

On the outer side of one of the standards A, are placed two pulleys, *a a*, one above the other, as seen in fig. 1.

A belt or rope, *b*, passes around the two pulleys *a a*, around a pulley, *c*, on the end of the shaft, on which one of the end rollers in the stacker C is placed.

The rope *b* also passes around a pulley, *d*, on a shaft, *e*, which passes through that part of the separator where the straw comes out, and is turned by a crank, E.

F represents the part of the separator referred to.

My machine is so placed, that when the straw comes out of the separator it will fall on the apron D, and, by the crank E, the apron is set in motion, so as to carry the straw either to the right or left, as may be desired.

At the same time, the pulleys *f* and *h*, connected by the rope *i*, carry the chaff out of the barn.

Having thus fully described my invention,

What I claim as new, and desire to secure by Letters Patent, is—

The combination of the stacker C, apron D, pulleys *a, a, b, d, c, f,* and *h*, and their connecting-cords, with the separator F, all substantially as and for the purposes set forth.

In testimony that I claim the foregoing, I have hereunto set my hand and seal, this 17th day of February, 1869.

JOEL F. PLUM. [L. S.]

Witnesses:
 JOHN F. FISHER,
 HENRY APPENGELLAN.